(12) United States Patent
Phillips

(10) Patent No.: US 7,654,065 B2
(45) Date of Patent: Feb. 2, 2010

(54) OFFSETTING CUTTING UNITS FOR A GRASS MOWING MACHINE

(75) Inventor: David Lawrence Phillips, Willow Springs, NC (US)

(73) Assignee: Deere & Company, Moline, IL (US)

(*) Notice: Subject to any disclaimer, the term of this patent is extended or adjusted under 35 U.S.C. 154(b) by 151 days.

(21) Appl. No.: 11/519,670

(22) Filed: Sep. 12, 2006

(65) Prior Publication Data

US 2008/0060331 A1    Mar. 13, 2008

(51) Int. Cl.
*A01D 75/30* (2006.01)
(52) U.S. Cl. .................................. 56/7; 56/15.1; 56/15.2
(58) Field of Classification Search ................. 56/6, 56/7, 10.4, 13.5, 13.6, 14.7, 14.9–15.3, 15.5, 56/228, 320.1
See application file for complete search history.

(56) References Cited

U.S. PATENT DOCUMENTS

| | | | | |
|---|---|---|---|---|
| 3,583,133 A | 6/1971 | Kasberger | ......................... | 56/6 |
| 4,769,976 A * | 9/1988 | Bassett et al. | ..................... | 56/7 |
| 4,866,917 A * | 9/1989 | Phillips et al. | .................... | 56/7 |
| 4,873,818 A | 10/1989 | Turner | ........................ | 56/10.8 |
| 4,887,417 A * | 12/1989 | Parsons, Jr. | ................... | 56/15.2 |
| 4,893,456 A | 1/1990 | Wallace | ...................... | 56/15.5 |
| 4,912,916 A | 4/1990 | Parsons, Jr. | | |
| 5,392,593 A | 2/1995 | Emery | | |
| 5,483,789 A | 1/1996 | Gummerson | ................. | 56/15.5 |
| 5,540,037 A * | 7/1996 | Lamb et al. | ....................... | 56/7 |
| 6,032,441 A | 3/2000 | Gust et al. | ....................... | 56/7 |
| 6,131,379 A * | 10/2000 | Ehn, Jr. | ......................... | 56/15.7 |
| 6,351,929 B1 | 3/2002 | Gust et al. | ........................ | 56/7 |
| 6,854,250 B2 | 2/2005 | Boyko | .......................... | 56/14.9 |
| 2006/0288681 A1* | 12/2006 | Kuzub | ........................ | 56/14.9 |

FOREIGN PATENT DOCUMENTS

| | | |
|---|---|---|
| DE | 299 09 876 | 9/1999 |
| EP | 1 159 866 | 7/2004 |
| EP | 1 800 532 | 6/2007 |

* cited by examiner

*Primary Examiner*—Thomas B Will
*Assistant Examiner*—Mai T Nguyen

(57) ABSTRACT

A mechanism for offsetting cutting units for a grass mowing machine includes lift arms that pivot between a first lowered position in which the cutting units are offset to the left of the traction vehicle, a second lowered position in which the cutting units are offset to the right of the traction vehicle, and a raised position intermediate the first and second lowered positions. Each lift arm has a first pivot axis and a second pivot axis parallel to the first pivot axis.

16 Claims, 4 Drawing Sheets

OFFSETTING CUTTING UNITS FOR A GRASS MOWING MACHINE

FIELD OF THE INVENTION

This invention relates generally to a grass mowing machine, and particularly to offsetting cutting units for a grass mowing machine to facilitate trimming along edges or under overhanging obstructions.

BACKGROUND OF THE INVENTION

Grass mowing machines such as trim mowers may be used for trimming along edges which drop off, such as golf course sand traps or bunkers, and for mowing under overhanging obstructions such as trees or bushes. Both of these situations require one or more cutting units to be as far outboard of the traction vehicle as possible. The cutting units should be capable of reaching under overhanging objects while the operator remains seated, and overhanging a drop off while the traction vehicle remains at a safe distance from the edge. Otherwise, the traction vehicle's weight may cause the edge to collapse, especially in sandy soil conditions. Or the traction vehicle may slide into a sand trap or bunker, get stuck, become high centered, or tip over. A mechanism is needed for offsetting cutting units for a grass mowing machine to trim along edges of features such as sand traps or bunkers, and minimize the risk of the traction vehicle sliding into a sand trap or bunker, getting stuck, etc.

To address these requirements, some grass mowing machines, including both reel and rotary types, include mechanisms for offsetting cutting units to one side of the traction vehicle, so that the cutting units may trim on that side only. Some other grass mowing machines provide mechanisms for offsetting cutting units to either side of the traction vehicle. For example, U.S. Pat. Nos. 6,032,441 and 6,351,929 relate to a triplex trim mower with a pair of laterally adjustable cutting units. The cutting units are supported by a lateral carrier frame which is slidably engaged to a lateral support frame. A hydraulic cylinder permits the carrier frame to be laterally displaced with respect to the traction vehicle frame so that a cutting unit can reach the edge of a bunker or sand trap while the vehicle maintains a distance from that feature. When trimming around an obstacle on a slope with the cutting units shifted to the downhill side, the trim mower may become unstable. The instability may result from all cutting units being shifted by a single carrier. The carrier supports its own weight along with the cutting units, cylinders and lift arms. When the single carrier shifts the cutting units to a downhill side, the center of gravity of the mower is moved into a less favorable position that can cause the mower to tip over. If the cutting units are shifted to one side of the machine using the single carrier frame, the opposite side wheel and tire may roll on uncut turf, resulting in poor cut quality and an unsightly cut pattern.

A mechanism for offsetting cutting units for a grass mowing machine is needed that provides high stability, especially on steep slopes. A mechanism for offsetting cutting units is needed that will not shift the center of gravity significantly as the cutting units are extended outwardly. A mechanism for offsetting cutting units is needed that can reduce the risk of damage to the edges of sand traps and bunkers.

Grass mowing machines, including trim mowers, also may need to raise and lower the cutting units on the outer ends of the lift arms. For example, lift arms may be extended to raise the cutting units to a transport or service position, and retracted to lower cutting units to a mowing position. Examples of grass mowing machines with hydraulic implement lift systems for mower cutting units are shown in U.S. Pat. Nos. 5,297,378, 5,343,680, 6,032,441 and 6,351,929. Commonly, lift arms attached to cutting units that are under or near the centerline of a grass mowing machine move about twenty degrees between the lowered and raised positions, while lift arms attached to the outside cutting units move about seventy degrees.

SUMMARY OF THE INVENTION

A mechanism for offsetting cutting units for a grass mowing machine is provided. The mechanism also can be used to raise the cutting units from a mowing position to a transport or service position. Each cutting unit is attached to a traction vehicle using a lift arm. Each lift arm includes a first leg pivotably mounted to the traction vehicle, a second leg pivotably mounted to the cutting unit, and a neck between the first and second legs. The lift arm may be rotated in a first direction to offset the cutting unit to the left of the traction vehicle, and in a second direction to offset the cutting unit to the right of the traction vehicle. The cutting unit may be raised to a transport position between the left and right offset positions.

DESCRIPTION OF THE PREFERRED EMBODIMENT

Figure 1:
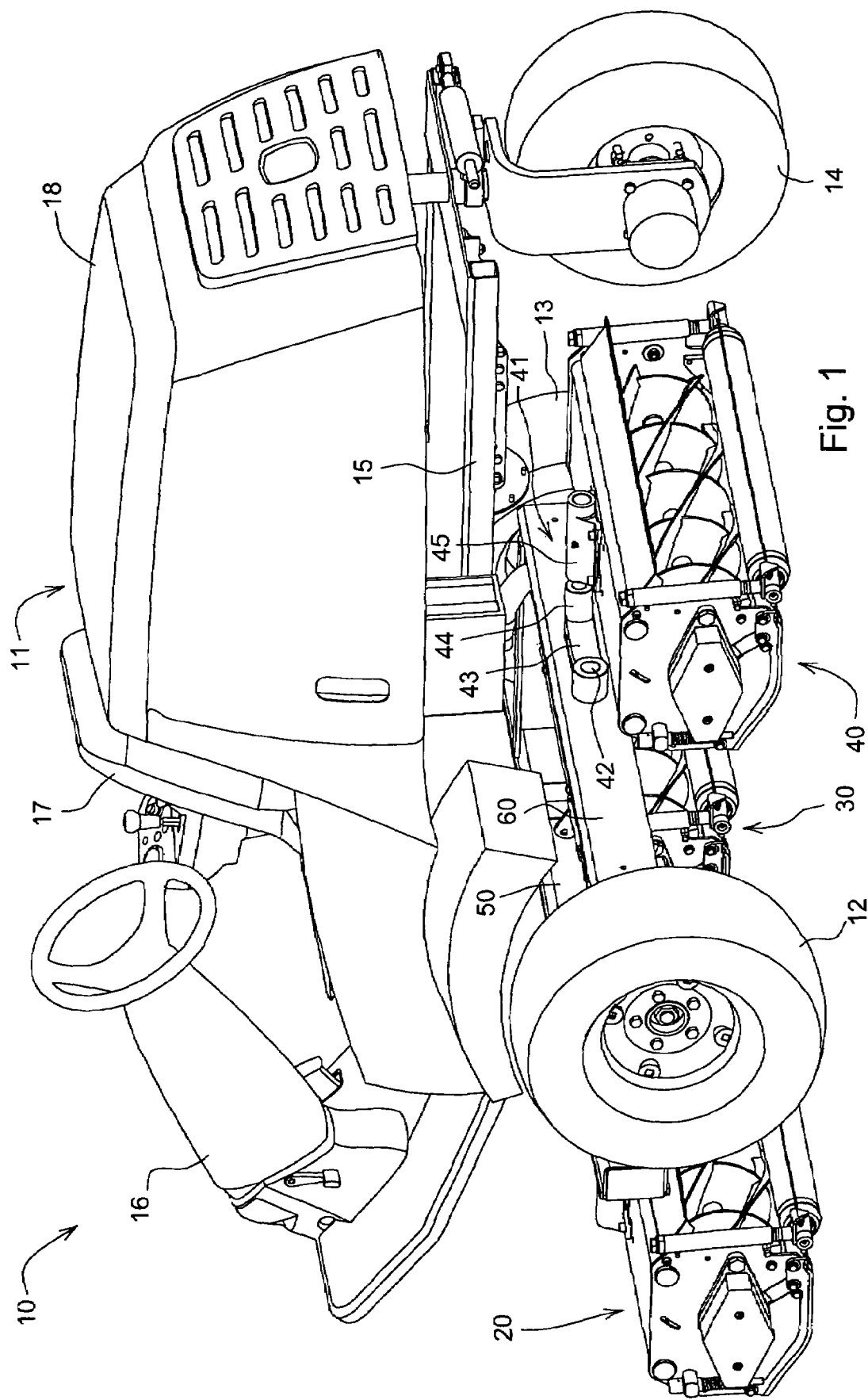
FIG. 1 is a perspective view of a grass mowing machine with a mechanism for offsetting cutting units according to a first embodiment of the invention.
Figure 2:
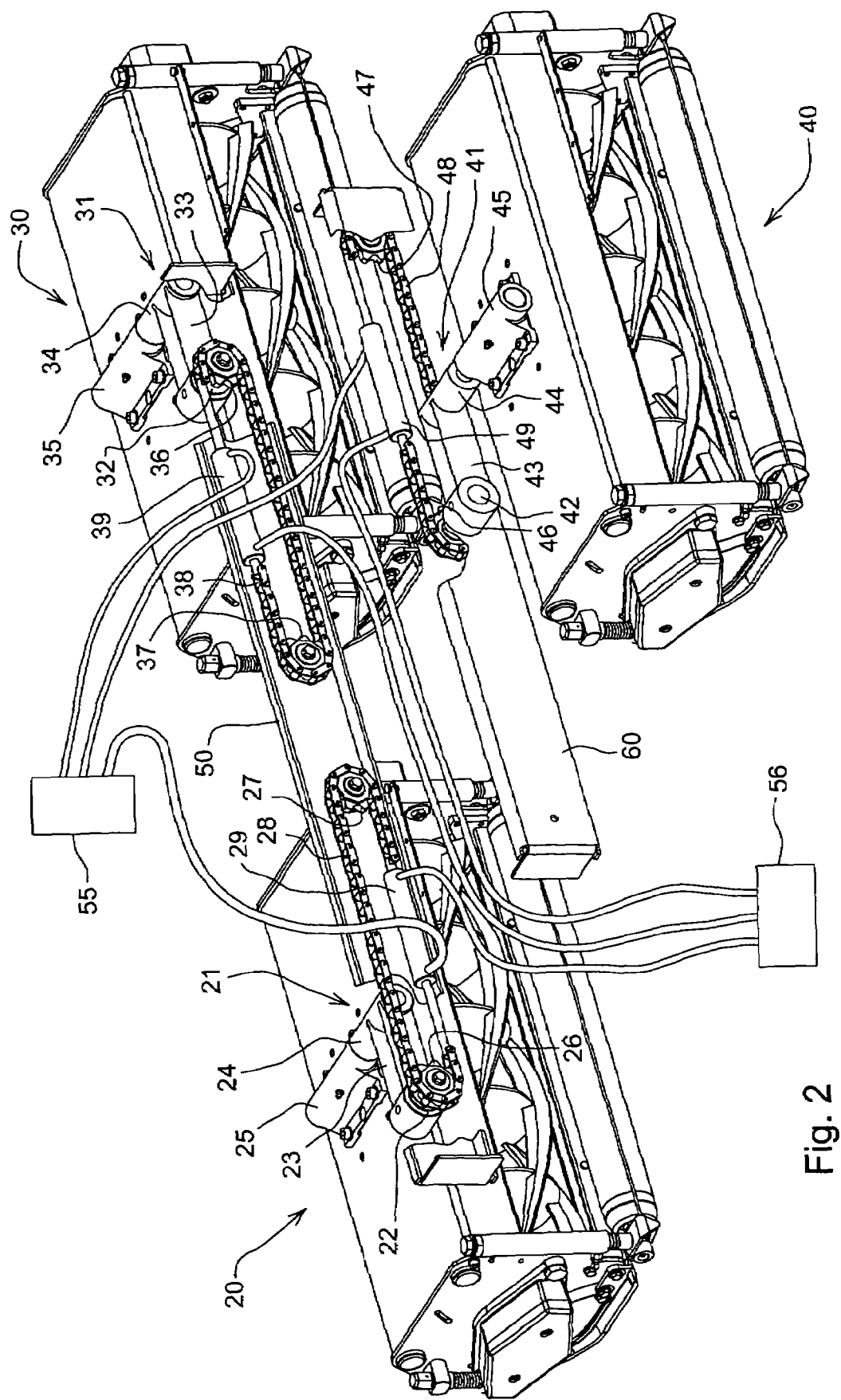
FIG. 2 is a rear perspective view of a mechanism for offsetting cutting units according to a first embodiment of the invention, in an offset right mowing position.
Figure 3:
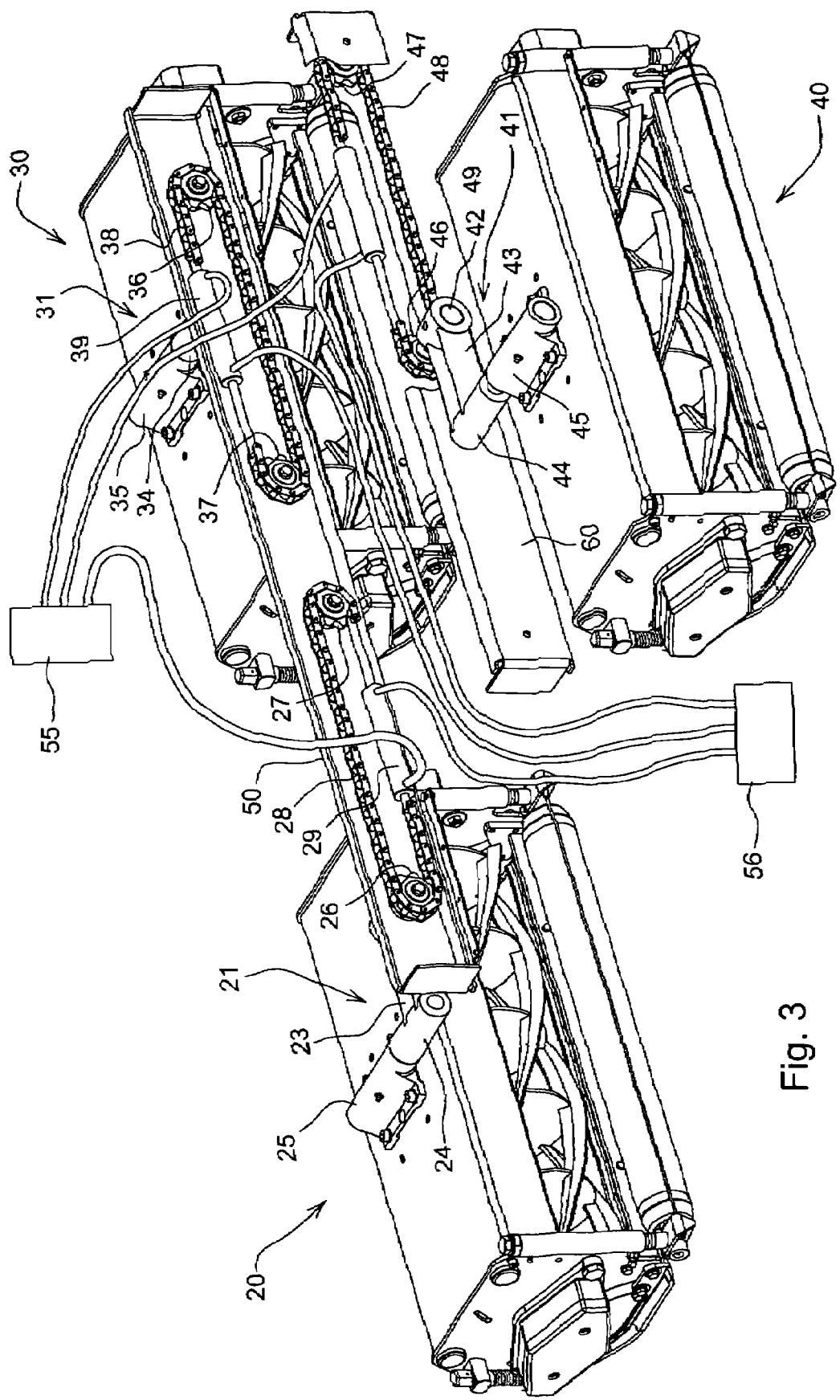
FIG. 3 is a rear perspective view of a mechanism for offsetting cutting units according to a first embodiment of the invention, in an offset left mowing position.
Figure 4:
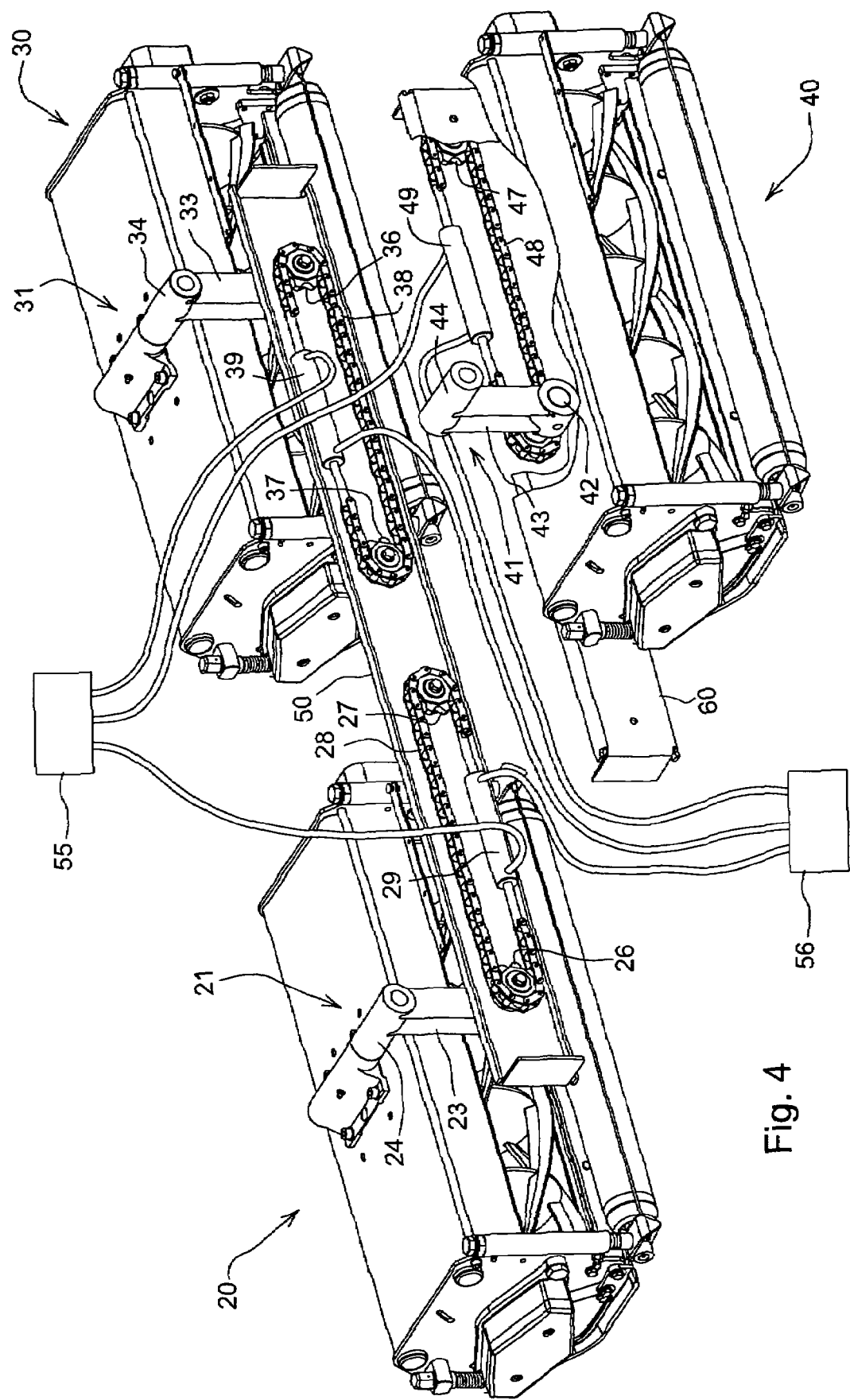
FIG. 4 is a rear perspective view of mechanism for offsetting cuffing units according to a first embodiment of the invention, in a raised transport position.

FIGS. 1-4 show a mechanism for offsetting cutting units for a grass mowing machine according to one embodiment of the invention. The mechanism may offset the cutting units to either side of the traction vehicle. Additionally, the same mechanism may be used to raise and lower the cutting units. The mechanism may lift the cutting units to the raised, transport position. In the raised, transport position, the cutting units may be centered with respect to the traction vehicle. The mechanism for offsetting cutting units provides a low center of gravity for stability when operating with the cutting units either raised or lowered to the offset left or offset right mowing positions.

The grass mowing machine may be a self-propelled trim mower 10 including a traction vehicle 11 adapted to carry and operate three reel-type cutting units 20, 30 and 40. The traction vehicle may have three wheels 12, 13 and 14 supporting a frame 15 with controls 16, operator station 17, and engine compartment 18 mounted on the frame.

Alternatively, the present invention may be used for grass mowing machines other than trim mowers, including but not limited to fairway mowers that carry five cutting units, and various other grass mowing machines with two or more cutting units. The mechanism for offsetting cutting units also may be used with rotary cutting units instead of reel-type cutting units.

In one embodiment, each cutting unit 20, 30 and 40 is connected to a lift arm 21, 31 and 41. The same lift arm that is used for offsetting the cutting unit is also used for lifting and lowering the cutting unit. Each lift arm has a first leg 22, 32 and 42 pivotably mounted to the traction vehicle on a first pivot axis and a second leg 24, 34 and 44 pivotably mounted to the cutting unit on a second pivot axis. The first leg of the lift arm may be rotated in a first direction to lower the cutting unit to a mowing position offset to the left of the traction vehicle, in a second direction to lower the cutting unit to a mowing position offset to the right of the traction vehicle, and to an intermediate position between the first and second positions to raise the cutting unit.

In one embodiment, each lift arm 21, 31 and 41 may have a "Z" shape with a first leg 22, 32 and 42, a second leg 24, 34 and 44, and a neck 23, 33 and 43 extending between the first and second legs. First leg 22, 32 and 42 of each "Z"-shaped lift arm provides a first generally horizontal pivot axis mounted to tool bar 50, 60 on traction vehicle 11. Second leg 24, 34 and 44 of each "Z"-shaped lift arm may provide a second generally horizontal pivot axis about which a cutting unit is mounted, which may be parallel to the first pivot axis. The second leg of the lift arm may be inserted through sleeve 25, 35 and 45 on the cutting unit. Each sleeve may include one or more bearings to facilitate rotation of the second leg of the lift arm on the second pivot axis as the cutting unit is raised or lowered. Lift arms 21, 31 and 41 may pivot radially about first pivot axes 22, 32 and 42 on the traction vehicle, allowing cutting units 20, 30 and 40 to pivot radially about second pivot axes 24, 34 and 44. As a result, cutting units 20, 30 and 40 may have the same orientation in the raised, transport position and the lowered, mowing position.

In one embodiment, if cutting unit 20, 30 and 40 is in a raised, transport position, the lift arm for that cutting unit may be generally vertical so that the first pivot axis 22, 32 and 42 is directly below and behind the second pivot axis 24, 34 and 44. Each cutting unit may be raised above the ground surface to a maximum height by approximately the length of neck 23, 33 and 43 of the lift arm.

In one embodiment, each of the cutting units 20, 30 and 40 may be mounted to lift arms 21, 31 and 41 in the same manner. Optionally, one or more cutting units, such as heavier or wider cutting units (i.e., having widths greater than about 26 inches), may be mounted to a pair of lift arms that act together to support the same cutting unit.

In one embodiment, lift arms 21, 31 and 41 may be rotated, either electrically or hydraulically, in the same direction to raise or lower cutting units 20, 30 and 40. In both the raised and lowered positions, lift arms 21, 31 and 41 may maintain the position and spacing of each cutting unit relative to the other cutting units. Maintaining the relative position of the cutting units prevents unlapping when they are lowered, and prevents contact between cutting units when they are raised.

In one embodiment, lift arms 21, 31 and 41 may be rotated in a first direction to lower cutting units 20, 30 and 40, and simultaneously position them in a mowing position offset to the left side of the traction vehicle. Lift arms 21, 31 and 41 may be rotated in a second direction to lower cutting units 20, 30 and 40 and position them in a mowing position offset to the right side of the traction vehicle. Lift arms 21, 31 and 41 may be rotated to a center position to lift the cutting units to a raised or transport position. The mechanism of the present invention also may lock lift arms 21, 31 and 41 in the raised or transport position.

In one embodiment, the mechanism may be operated by an operator's selection of a left/right switch, to offset the cutting units to mowing positions on the left and right sides of the traction vehicle. The lift arms may be released when the lift arms are in the mowing position, so that the cutting units can be free floating to follow ground contours. For example, if a hydraulic cylinder is used to turn each lift arm, the hydraulic cylinder may be configured so that each cutting unit may float in both of the lowered mowing positions, offset left or right. A passage across the piston in the hydraulic cylinder may open if the cutting unit is in a mowing position, allowing hydraulic fluid to flow to either side of the piston. Additionally, each cutting unit may be locked in the raised, transport position. For example, this may be done by blocking the cylinder stroke mechanically or hydraulically when the cutting units are in the raised position. Additionally, a shaft encoder may be used to indicate the position of the lift arm.

In one embodiment, the first end of each lift arm 21, 31 may be pivotably mounted to the traction vehicle through tool bar 50, and the first end of lift arm 41 may be pivotably mounted through tool bar 60. Sprockets 26, 36 and 46 may be mounted to the first leg 22, 32 and 42 of each lift arm. Idler sprockets 27, 37 and 47 also may be pivotably mounted to tool bars 50 and 60 respectively. A standard roller chain 28, 38 and 48 may engage each pair of sprockets.

In one embodiment, the chain and sprockets may move the cutting units clockwise or counterclockwise to offset them to cutting positions offset to the left and the right of the traction vehicle. To power the chain movement, double acting hydraulic cylinders 29, 39 and 49 with rods extending from each end thereof may be interconnected to chains 28, 38 and 48. Each double acting hydraulic cylinder may have a port on each side of a piston. The piston in each double acting cylinder may provide sufficient force to move the chain in either direction, rotating the sprockets in a first direction to offset the cutting unit to the left, in a second direction to offset the cutting unit to the right, or raise the cutting unit in an intermediate position.

In one embodiment, the ports on a first side of the piston in each hydraulic cylinder may be connected to common valve 55, and the ports on the second side of the piston in each hydraulic cylinder may be connected to a common valve 56. Valves 55 and 56 may be used to control and regulate hydraulic flow and operate the hydraulic cylinders in unison to raise and lower the cutting units together in unison. Thus, the conduit and cylinder used to raise and lower each cutting unit may be subject to the same hydraulic pressure and flow.

Alternatively, a hydraulic rotary actuator may be used instead of a hydraulic cylinder, chain and sprockets for turning the first leg of the lift arm for each cutting unit. For example, a hydraulic rotary actuator may be mounted directly to the tool bar so that it can engage the first leg of each lift arm. In still another embodiment, an electric motor may be used to offset and raise the cutting units. The electric motor may be mounted to the tool bar where it can engage the first leg of each lift arm.

In one embodiment, each lift arm can turn in an arc of about 180 degrees between the lowered left position and the lowered right position. The neck portion of the lift arm may have a length of between about six inches and about twelve inches for most cutting units, and this length provides the maximum offset for each cutting unit to either the left or right side of the traction vehicle. The length of the neck portion of each lift arm also may be limited by the amount of clearance under the frame of the traction vehicle available for a raised cutting unit, and the need for each cutting unit to be located in front of a tire in the offset position so the grass is mowed before the tire rolls over it.

Having described a preferred embodiment, it will become apparent that various modifications can be made without departing from the scope of the invention as defined in the accompanying claims.

The invention claimed is:

1. A mechanism for offsetting cutting units for a grass mowing machine, comprising:
    a lift arm for each cutting unit, each lift arm having a first leg pivotably mounted to the grass mowing machine on a first pivot axis, and a second leg mounted to the cutting unit on a second pivot axis;
    the first leg of each lift arm rotatable in a first direction on the first pivot axis to lower the cutting unit to a first mowing position offset to the left of the grass mowing machine, rotatable in a second direction on the first pivot axis to lower the cutting unit to a second mowing position offset to the right of the grass mowing machine, and rotatable to an intermediate position between the first and second mowing positions to raise the cutting unit in which the lift arm is generally vertical with the first pivot axis below the second pivot axis; each cutting unit being spaced from the other cutting units; and
    a mechanism interconnecting between the lift arms to rotate the lift arms in the same direction between the first and the second mowing positions and the intermediate position while in each position maintaining the same spacing of each cutting unit relative to the other cutting units.

2. The mechanism for offsetting cutting units of claim 1 wherein the first pivot axis and the second pivot axis are parallel.

3. The mechanism for offsetting cutting units of claim 1 further comprising a sleeve on each cutting unit through which the second leg of the lift arm is inserted.

4. The mechanism for offsetting cutting units of claim 1 wherein the second leg is above the first leg as the cutting unit is at the intermediate position.

5. The mechanism for offsetting cutting units of claim 1 further comprising an electric motor to rotate the first leg of each lift arm.

6. The grass mowing machine of claim 1 further comprising a hydraulic cylinder to rotate the first leg of each lift arm.

7. A mechanism for offsetting cutting units for a grass mowing machine comprising:
    a plurality of cutting units, each cutting unit connected by a lift arm to a traction vehicle;
    the lift arms interconnected together and pivotable in unison between a first lowered position in which the cutting units are offset to the left of the traction vehicle, a second lowered position in which the cutting units are offset to the right of the traction vehicle, and a raised position intermediate the first and second lowered positions in which the lift arms can be locked in a generally vertical alignment;
    wherein each cutting unit is spaced relative to the other cutting units and maintains the same spacing in the raised position and in the first and second lowered positions.

8. The mechanism for offsetting cutting units of claim 7 wherein each lift arm has a first pivot axis and a second pivot axis parallel to the first pivot axis.

9. The mechanism for offsetting cutting units of claim 7 wherein each lift arm is "Z"-shaped.

10. The mechanism for offsetting cutting units of claim 7 further comprising an electric motor to raise and lower the lift arms between the raised position and the first and second lowered positions.

11. The mechanism for offsetting cutting units of claim 7 further comprising at least one hydraulic cylinder to raise and lower the lift arms.

12. A mechanism for offsetting cutting units for a grass mowing machine, comprising:
    a traction vehicle having a plurality of cutting units attached thereto by lift arms, each lift arm including a first leg pivotably mounted to the traction vehicle, a second leg pivotably mounted to one of the cutting units, and a neck between the first and second legs; and
    the first leg of each lift arm rotatable in a first direction and a second direction, rotation in the first direction offsetting the cutting units to the left of the traction vehicle, rotation in the second direction offsetting the cutting units to the right of the traction vehicle, the cutting units being raised to a transport position in which the neck of each lift arm is generally vertical with the first leg below the second leg if the first leg is rotated intermediate the first and second directions; and
    an actuation mechanism interconnected between the lift arms to rotate the lift arms in unison so that the cutting units maintain the same spacing relative to the other cutting units while offset to the left or right of the traction vehicle or in the transport position.

13. The mechanism for offsetting cutting units of claim 12 further comprising an electric motor rotating the first leg of each lift arm in the first direction offset to the left of the traction vehicle and in the second direction offset to the right of the traction vehicle.

14. The mechanism for offsetting cutting units of claim 12 further comprising a hydraulic cylinder rotating the first leg of each lift arm.

15. The mechanism for offsetting cutting units of claim 12 wherein each lift arm is "Z"-shaped.

16. The mechanism for offsetting cutting units of claim 12 wherein the first leg of each lift arm defines a first axis, and the second leg defines a second axis parallel to the first.

* * * * *